United States Patent
Seong et al.

(10) Patent No.: US 8,494,055 B2
(45) Date of Patent: Jul. 23, 2013

(54) APPARATUS AND METHOD FOR FRAME INTERPOLATION BASED ON ACCURATE MOTION ESTIMATION

(75) Inventors: Yeol Min Seong, Seoul (KR); Yang Ho Cho, Hwaseong-si (KR); Ho Young Lee, Suwon-si (KR); Hyun Wook Park, Daejeon-si (KR)

(73) Assignees: Samsung Electronics Co., Ltd., Suwon-Si (KR); Korea Advanced Institute of Science and Technology, Daejeon (KR)

( * ) Notice: Subject to any disclaimer, the term of this patent is extended or adjusted under 35 U.S.C. 154(b) by 646 days.

(21) Appl. No.: 12/382,190

(22) Filed: Mar. 10, 2009

(65) Prior Publication Data
US 2010/0053451 A1 Mar. 4, 2010

(30) Foreign Application Priority Data
Sep. 3, 2008 (KR) .................. 10-2008-0086717

(51) Int. Cl.
*H04N 7/12* (2006.01)
(52) U.S. Cl.
USPC .................................... 375/240.16

(58) Field of Classification Search
USPC ............. 375/240.01, 240.24, 240.03, 240.27
IPC ......................................................... H04N 5/14
See application file for complete search history.

(56) References Cited

U.S. PATENT DOCUMENTS

| | | | | |
|---|---|---|---|---|
| 2002/0118758 | A1* | 8/2002 | Sekiguchi et al. | 375/240.18 |
| 2005/0286632 | A1* | 12/2005 | Van Der Schaar et al. | 375/240.16 |
| 2006/0280250 | A1* | 12/2006 | Ishii | 375/240.16 |
| 2009/0110076 | A1* | 4/2009 | Chen | 375/240.16 |

FOREIGN PATENT DOCUMENTS

| | | |
|---|---|---|
| JP | 2005-6275 | 1/2005 |
| JP | 2005-268912 | 9/2005 |
| JP | 2007-181674 | 7/2007 |
| JP | 2008-022156 | 1/2008 |

* cited by examiner

*Primary Examiner* — David Czekaj
*Assistant Examiner* — Tracy Li
(74) *Attorney, Agent, or Firm* — Staas & Halsey LLP

(57) ABSTRACT

An apparatus and a method for frame interpolation based on precision motion estimation are provided. The apparatus for frame interpolation may generate an interpolation frame to restore images based on a motion vector which is determined after a motion vector is determined based on a rotation element in addition to forward motion and backward motion between frames.

18 Claims, 8 Drawing Sheets

APPARATUS AND METHOD FOR FRAME INTERPOLATION BASED ON ACCURATE MOTION ESTIMATION

CROSS-REFERENCE TO RELATED APPLICATIONS

This application claims the benefit of Korean Patent Application No. 10-2008-0086717, filed on Sep. 3, 2008, in the Korean Intellectual Property Office, the disclosure of which is incorporated herein by reference.

BACKGROUND

1. Field

One or more embodiments of the following description relate to a method for frame interpolation for restoring an image, and more particularly, to a method for frame interpolation for restoring an image based on motion estimation and motion compensation between frames.

2. Description of the Related Art

When playing a moving image using a moving image display device based on a driving method, a "motion blur" phenomenon may occur where moving images appear blurred. This phenomenon may degrade a moving image quality and result in loss of detailed image information, particularly when images have a high contrast level or fine color variations.

Also, moving image data is sometimes compressed to be accommodated within a predefined bit rate when transmitting a large volume of moving image data through a limited bandwidth during image processing. As only selected frames are transmitted, as opposed to sending all frames, for the purpose of reducing the data transmission load, data loss often occurs and a moving image quality is degraded as a result.

Various frame interpolation techniques may be used to restore images by increasing a number of frames to improve an image quality of a display device. One of such interpolation techniques is motion compensation frame interpolation that restores images through motion estimation.

In such a motion estimation technique for frame interpolation it is important to accurately search motion vectors of images to interpolate intermediate frames via the motion prediction. The more accurately the motion vectors are searched, the closer the interpolated images will be to an original image.

Accordingly, continued research efforts are necessary for improved motion estimation and motion compensation in addition to studies for improving the image quality of display devices.

SUMMARY

According to one or more example embodiments, there may be provided an apparatus for frame interpolation including an initial motion vector determination unit to determine an initial motion vector of each of current blocks of an interpolation frame by performing forward motion estimation and backward motion estimation for a current frame and a previous frame, a result motion vector determination unit to determine a result motion vector which includes a rotation element by rotating a block of the current frame and the previous frame being determined according to the initial motion vector, and a frame generation unit to generate the interpolation frame according to the result motion vector.

Additional aspects and/or advantages will be set forth in part in the description which follows and, in part, will be apparent from the description, or may be learned by practice of the invention.

In this instance, the initial motion vector determination unit may include: a forward motion calculation unit to calculate a forward motion vector from the previous frame to the current frame, a backward motion calculation unit to calculate a backward motion vector from the current frame to the previous frame, a motion vector difference calculation unit to calculate a motion vector difference between the forward motion vector and the backward vector for a current block of the interpolation frame, and a initial motion vector selection unit to select the initial motion vector of the current block based on the motion vector difference.

Also, the result motion vector determination unit may include: an initial location selection unit to select an initial location of each of the current frame and the previous frame using the initial motion vector, an error calculation unit to calculate a block matching error between blocks by rotating a block corresponding to an initial location of the current frame and the previous frame, and a rotation element selection unit to select a rotation angle when the block matching error is a minimum as a rotation element.

According to example embodiments, there may also be provided a method of frame interpolation including: determining an initial motion vector of each of current blocks of an interpolation frame by performing forward motion estimation and backward motion estimation for a current frame and a previous frame, determining a result motion vector which includes a rotation element by rotating a block of the current frame and the previous frame being determined according to the initial motion vector, and generating the interpolation frame according to the result motion vector.

BRIEF DESCRIPTION OF THE DRAWINGS

These and/or other aspects, features, and advantages of example embodiments will become apparent and more readily appreciated from the following description, taken in conjunction with the accompanying drawings of which.

DETAILED DESCRIPTION

Figure 1:
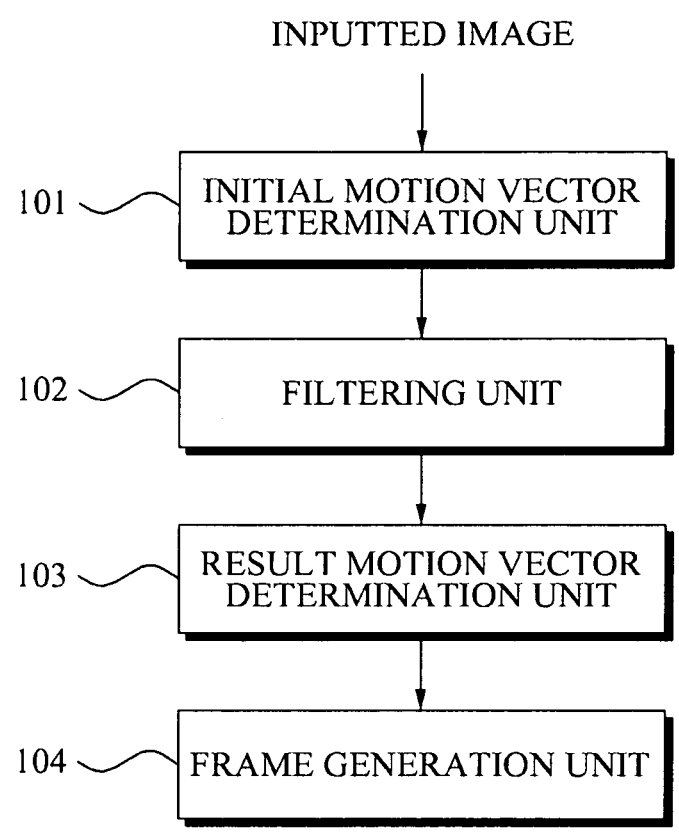
FIG. 1 is a diagram illustrating an apparatus for frame interpolation according to example embodiments.

Reference will now be made in detail to example embodiments, examples of which are illustrated in the accompanying drawings, wherein like reference numerals refer to like elements throughout. Example embodiments are described below to explain the present disclosure by referring to the figures.

FIG. 1 is a diagram illustrating an apparatus for frame interpolation according to example embodiments. Referring to FIG. 1, the apparatus for frame interpolation may include, for example, an initial motion vector determination unit 101, a filtering unit 102, a result motion vector determination unit 103, and a frame generation unit 104.

The initial motion vector determination unit 101 may determine an initial motion vector of each of current blocks of an interpolation frame by performing forward motion estimation and backward motion estimation with respect to a current frame and a previous frame. The initial motion vector determination unit 101 may determine the initial motion vector using a block matching algorithm. Distortion of the interpolation frame may be created when an initial motion vector is inaccurately searched. Therefore, forward motion estimation and backward motion estimation are performed to generate a highly reliable motion vector as an initial motion vector.

The filtering unit 102 may apply a filter algorithm to smooth the initial motion vector. The filtering unit 102 may apply the Median Filter Algorithm, which uses a motion vector difference (MVD) obtained from the forward and backward motion estimations.

The result motion vector determination unit 103 may determine the result motion vector, which is based on a rotation element, by searching for a portion where a rotation occurs, in addition to a portion where translational motion occurs, between a current frame and previous frame. That is, the result motion vector determination unit 103 may determine a three dimensional (3D) result motion vector, that is an x axis, y axis, and rotation, by including the rotation element in the initial motion vector.

The frame generation unit 104 may generate an interpolation frame using the result motion vector between a current frame and a previous frame based on Overlapped Block Motion Compensation(OBMC).

Consequently, the apparatus for frame interpolation may perform frame interpolation using precision motion estimation by determining a motion vector that is based on the movements in both directions as well as the rotation element between frames.

Figure 2:
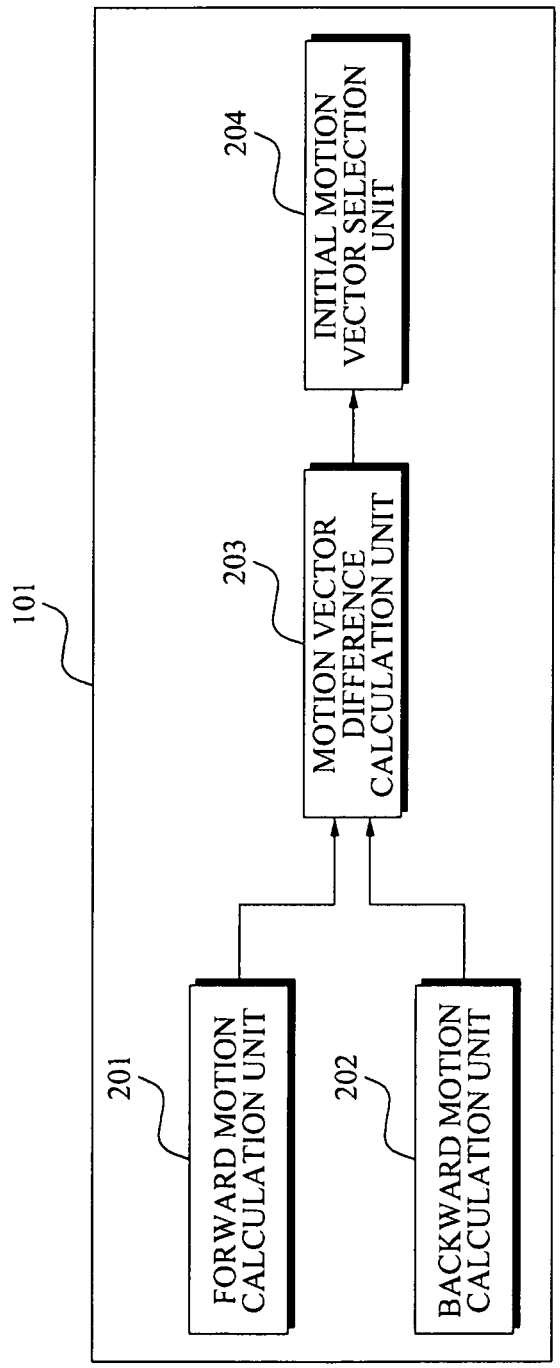
FIG. 2 is a block diagram illustrating an example of an initial motion vector determination unit 101 of FIG. 1.

FIG. 2 is a block diagram illustrating an example of an initial motion vector determination unit of FIG. 1. Referring to FIG. 2, the initial motion vector determination unit 101 of FIG. 1 may include, for example, a forward motion calculation unit 201, a backward motion calculation unit 202, a motion vector difference calculation unit 203, and an initial motion vector selection unit 204.

The initial motion vector determination unit 101 performs forward motion estimation and backward motion estimation for each block to accurately identify an initial motion vector.

Figure 3:
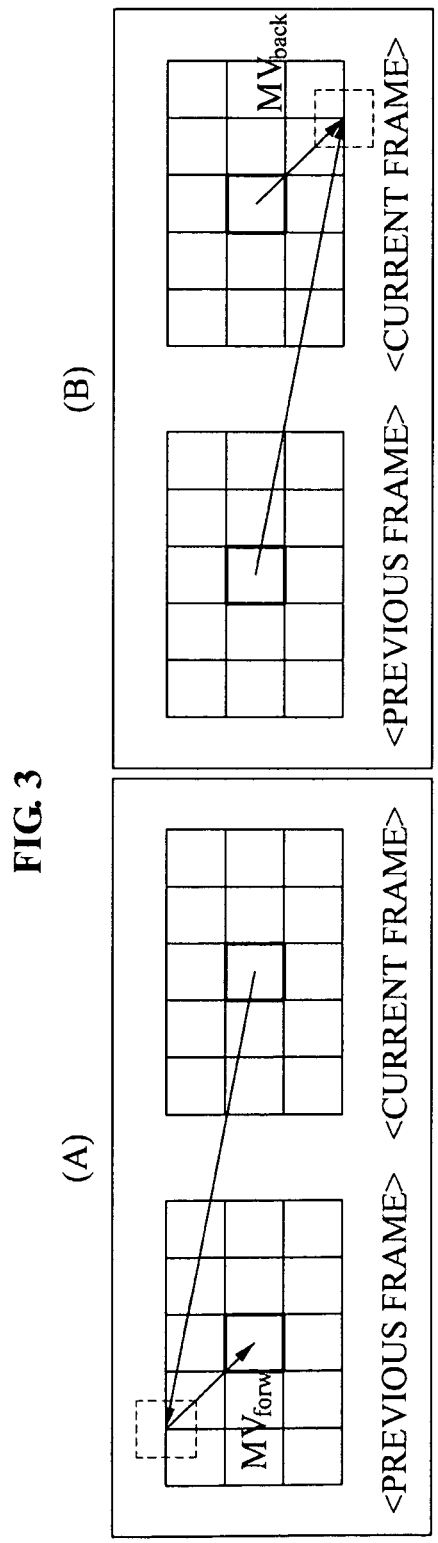
FIGS. 3 and 4 are diagrams illustrating operations of the initial motion vector determination unit of FIG. 2.

As seen in the (A) diagram of FIG. 3, the forward motion calculation unit 201 calculates a forward motion vector $MV_{forw}$ from a previous frame to a current frame to search for a magnitude and a direction of a forward motion vector from the previous frame based on the current frame.

As seen in the (B) diagram of FIG. 3, the backward motion calculation unit 202 calculates a backward motion vector $MV_{back}$ from the current frame to the previous frame to search for a magnitude and a direction of a backward motion from the current frame based on the previous frame.

Once forward motion estimations and backward motion estimations are performed, two candidate motion vectors are created with respect to each block of an interpolation frame, namely the forward motion vector $MV_{forw}$ and the backward motion vector $MV_{back}$.

The motion vector difference calculation unit 203 calculates a motion vector difference (MVD) between the forward motion vector $MV_{forw}$ and the backward motion vector $MV_{back}$ for a current block of the interpolation frame. The motion vector difference (MVD) may be defined as illustrated in Equation 1 below.

$$MVD = |MV_{forw} - MV_{back}| \qquad \text{Equation 1:}$$

The initial motion vector selection unit 204 selects a motion vector having high reliability as the initial motion vector for the current block, from among multiple candidate motion vectors based on their MVDs.

As an example, the initial motion vector selection unit 204 may select either the forward motion vector $MV_{forw}$ or the backward motion vector $MV_{back}$ as the initial motion vector based on the MVD.

Here, when the MVD calculated by the initial motion vector selection unit 204 is zero, the forward motion vector $MV_{forw}$ and the backward motion vector $MV_{back}$ are the same and both candidate motion vectors may be considered as being equal. This may be interpreted to indicate that continuous linearity of the current frame is well maintained. Therefore, either one of the candidate motion vectors may be selected as the initial motion vector.

As another example, the initial motion vector selection unit 204 may select either of two candidate vectors by comparing the calculated MVD and a predetermined threshold T. Here, the threshold T may be an error range in which motion correction is possible with respect to a motion vectors.

Here, the initial motion vector selection unit 204 may compare a block matching error of the forward motion vector $MV_{forw}$ and the backward motion vector $MV_{back}$ and may select a motion vector having a smaller block matching error as the initial motion vector when the MVD is greater than 0 and less than the predetermined threshold T.

The block matching error of the forward motion vector $MV_{forw}$ may indicate an average value of a difference in pixel brightness between a current block of a previous frame and the current block of the current frame, which has been moved from the current block of the previous frame by the forward motion vector $MV_{forw}$. Similarly, a block matching error of the backward motion vector $MV_{back}$ may indicate an average value of pixel brightness differences between the current block of the current frame and the current block of the previous frame, which was moved from the current block of the previous frame by the backward motion vector $MV_{back}$.

A motion vector having a smaller block matching error may be selected from the forward motion vector $MV_{forw}$ and the backward motion vector $MV_{back}$.

As another example, the initial motion vector selection unit 204 may compare the MVD and the threshold T and determine the initial motion vector using the initial motion vectors of blocks adjacent to the current block.

Here, if the MVD is larger than the threshold T, motion vector reliability may be poor despite bi-directional motion estimations on the current block. Such a situation may occur in the case of occlusions or in the case of a small object moving quickly in a fixed background. In such situations, motion correction may be difficult even though bidirectional motion estimations are performed.

When the MVD is larger than the threshold T, the initial motion vector selection unit 204 may use initial motion vectors of adjacent blocks to determine the initial motion vector of the current block.

For this, the forward motion vectors $MV_{forw}$ calculated from all blocks of the previous frame to the current frame and the backward motion vectors $MV_{back}$ calculated for all blocks of the current frame to the previous frame may be stored and maintained. Initial motion vectors corresponding to blocks that are adjacent to the current block may be selected and used for determining the initial motion vector of the current block.

When the MVD of the current block is larger than the threshold T, the motion vector having a smallest estimation error from among all initial motion vectors already established for all adjacent blocks may be selected as the initial motion vector of the current block. As an example, in a 3×3 block structure based on the current block, eight peripheral blocks excluding the current block may be used as adjacent blocks. A quantity of adjacent blocks may vary depending on hardware complexity.

Figure 4:
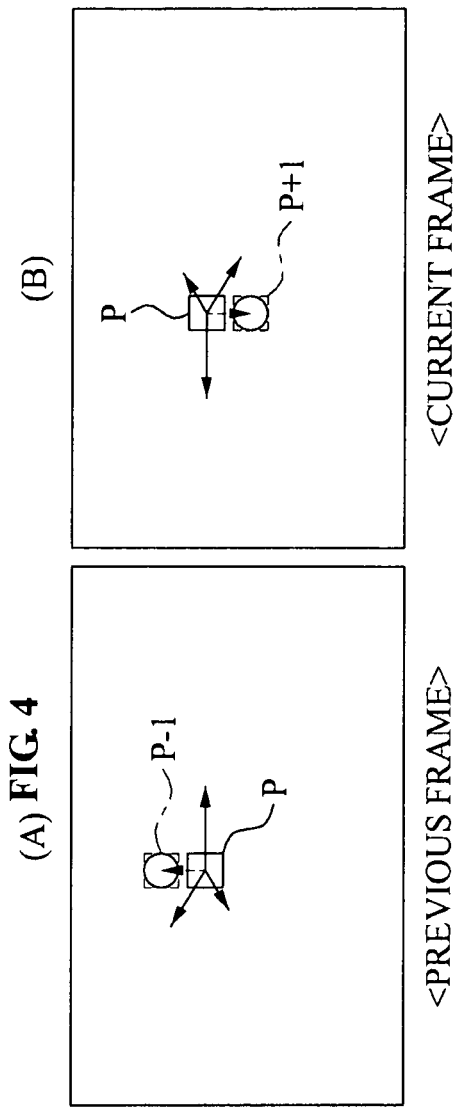

With reference to diagram A and B of FIG. 4, since the illustrated frames have fixed backgrounds, candidate motion vectors (illustrated in solid lines or dotted lines) may vary, which may be selected using a block matching error for a block P. However, when a motion vector corresponding to a dotted line for the block P may not be selected, an image corresponding to a (P-1) block may not exist or distortion may occur for the (P-1) block in the interpolation frame.

When the MVD is larger than the threshold T for the block P, the initial motion vector selection unit 204 may select, from among blocks adjacent to the block P, a block whose MVD is 0 or smaller than the threshold T and passes through the current block at the same time as candidate blocks.

Also, the initial motion vector selection unit 204 may establish a search area including the selected candidate blocks, determine an initial motion vector of the block included in the search area as candidate motion vectors for the current block, and select a motion vector having a smallest block matching error from among the candidate motion vectors as the initial motion vector for the current block.

Also, when adjacent blocks having suitable conditions as candidate blocks for the block P do not exist, the initial motion vector selection unit 204 may expand a range of adjacent blocks to select the initial motion vectors for the current block.

Accordingly, since the initial motion vector for the current block is determined from among the initial motion vectors of adjacent blocks, motion vectors maintain spatial correlation so that abrupt errors may be avoided.

When the selection of initial motion vectors is completed for all blocks in the interpolation frame, the filtering unit 102 may selectively apply a Median Filter to blocks (hereinafter "error blocks") having an MVD greater than the threshold T. When an MVD of each block is less than the threshold T, since the correlation between a forward motion vector $MV_{forw}$ and a backward motion vector $MV_{back}$ of a corresponding block is greater, use of the Median Filter may result in distortion of motion vectors.

For each error block, the filtering unit 102 may select, from among adjacent blocks (in up/down, left/right, and diagonal directions), a block having an MVD smaller than the threshold T as a candidate block, and the Median Filter may be applied using the initial motion vectors of the candidate blocks. Specifically, the filtering unit 102 may select the initial motion vectors of the candidate blocks as the candidate motion vectors for the error block, and select an average of the candidate motion vector applied to the Median Filter as the initial motion vector for each error block.

Therefore, an initial motion vector that is determined for each block in an interpolation frame, and the Median Filter is selectively applied. Thereby a motion vector having a lower reliability is removed and a possibility of an erroneous motion vector being selected as an initial motion vector is minimized.

Figure 5:
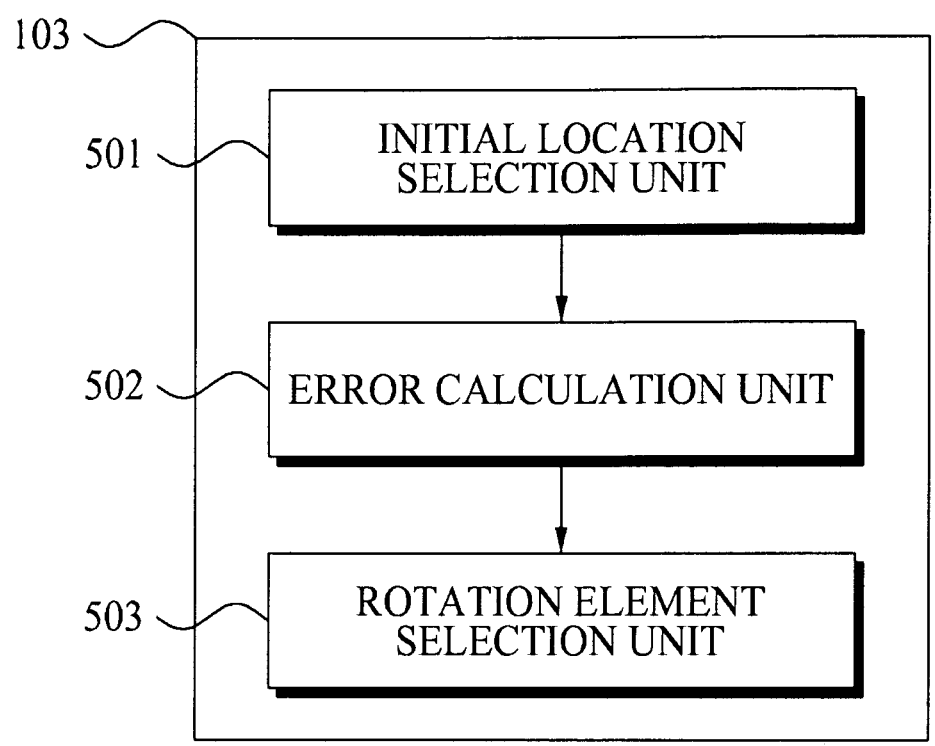
FIG. 5 is a block diagram illustrating an example of a result motion vector determination unit 103 of FIG. 1.

FIG. 5 is a block diagram illustrating an example of the result motion vector determination 103 of FIG. 1. As shown in FIG. 5, the result motion vector determination unit 103 may include an initial location selection unit 501, an error calculation unit 502, and a rotation element selection unit 503.

The result motion vector determination unit 103 may divide an initial motion vector into halves to generate an interpolation frame when the initial motion vector is determined for each block.

The initial location selection unit 501 may select initial locations for the current frame and the previous frame for each block using the initial motion vector.

Figure 6:
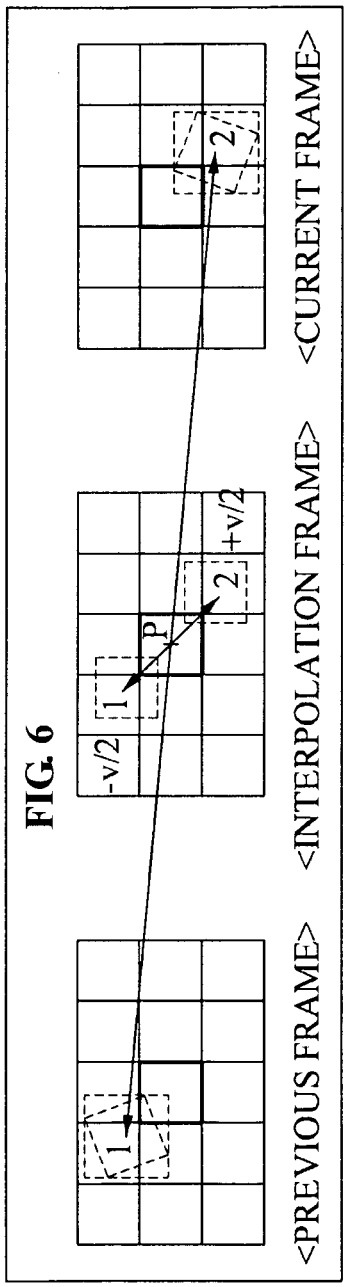
FIG. 6 is a diagram illustrating operations of the result motion vector determination unit of FIG. 5.

With reference to FIG. 6, to generate an interpolation frame from a current block of a current frame using an initial motion vector V, a block 1, having moved from the current block P position of the interpolation frame to the previous frame by −V/2, and a block 2, having moved from the current block P position of the interpolation frame to the current frame by +V/2, are determined as the initial positions.

The error calculation unit 502 may rotate block 1, corresponding to the initial location of the previous frame, and block 2, corresponding to the initial location of the current frame, to calculate a block matching error between blocks. When rotation is performed from the previous frame to the current frame by D degrees, the interpolation frame may indicate an image rotated by D/2 degrees. To obtain an accurate rotation element for each block, blocks 1 and 2 corresponding to the initial locations of the previous frame and the current frame, respectively, may be symmetrically rotated by predetermined angles (±θ degrees) to calculate the block matching error.

The rotation element selection unit 503 may select a rotation angle where the calculated block matching error is a minimum as a rotation element for the current block of the interpolation frame.

The result motion vector determination unit 103 may select a motion vector whose block matching error is the minimum as a result motion vector based on a rotation element. That is, block matching errors are estimated in two directions for the current block of an interpolation frame, thereby the result motion vector including the rotation element is determined.

Accordingly, the frame generation unit 104 of FIG. 1 may generate a result interpolation frame by applying Overlapped Block Motion Compensation (OBMC) based on the result motion vector made up of three elements, an x axis, a y axis, and rotation.

Figure 7:
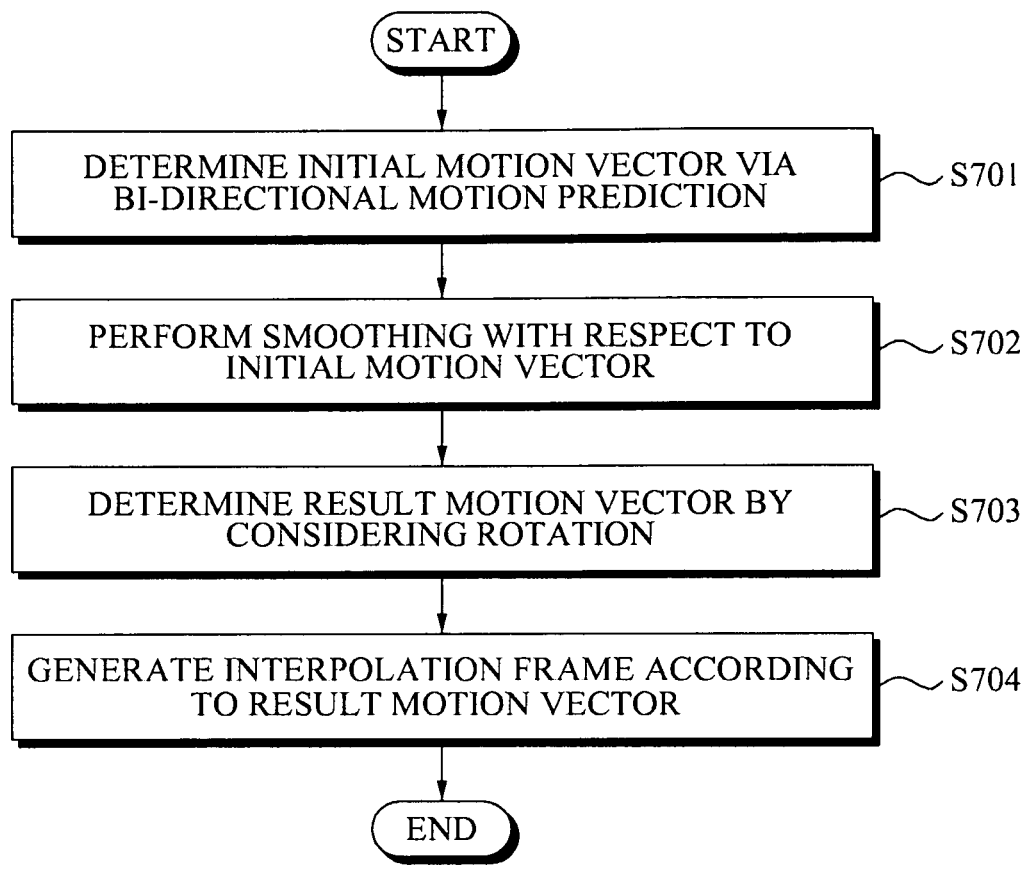
FIG. 7 is a flowchart illustrating a method for frame interpolation according to example embodiments.

FIG. 7 is a flowchart illustrating a method for frame interpolation according to example embodiments.

In the method for frame interpolation according to example embodiments, processes of generating interpolation frames are as described below:

The method for frame interpolation according to the example embodiments may perform forward motion estimation and backward motion estimation with respect to a current frame and a previous frame, and determine an initial motion vector with respect to a current block of the interpolation frame in operation S701. Here, the determining of the initial motion vector in operation S701 may search for a motion vector using a block matching algorithm, and determine a motion vector having a higher reliability as the initial motion vector through the forward and backward motion estimations.

Figure 8:
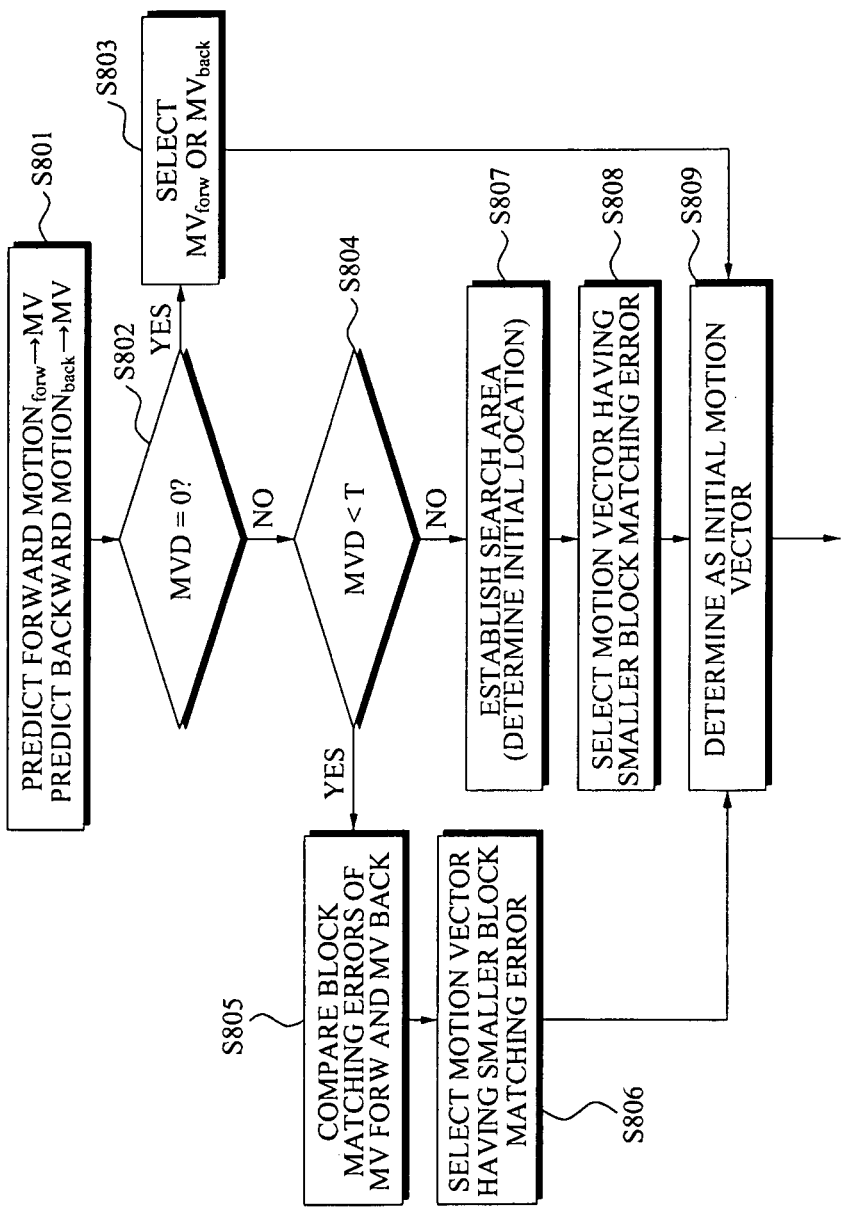
FIG. 8 is a flowchart illustrating operations of determining of the initial motion vector shown in FIG. 7.

The determining of the initial motion vector in operation S701 may include the following operations:

With reference to FIG. 8, the determining of the initial motion vector in operation S701 may calculate a forward motion vector $MV_{forw}$ from a previous frame to a current frame, and calculate a backward motion vector $MV_{back}$ from the current frame to the previous frame in operation S801.

Also, the determining of the initial motion vector may calculate an MVD between the forward motion vector $MV_{forw}$ and the backward motion vector $MV_{back}$ for each current block of the interpolation frame, and may determine, in operation S802, whether the MVD is zero. When the MVD is zero, either the forward motion vector $MV_{forw}$ or the backward motion vector $MV_{back}$ is selected in operation S803, and the selected motion vector is determined as the initial motion vector for the current block of interpolation frame in operation S809.

Alternatively, the determining of the initial motion vectors in operation S701 may determine whether the MVD is greater than zero and is less than a predefined threshold T in operation S804. When the MVD is greater than zero and is less than the predefined threshold T, block matching errors of the forward motion vector $MV_{forw}$ and the backward motion vector $MV_{back}$ are compared in operation S805, a motion vector having a smaller block matching error is selected in operation S806, and the selected motion vector is determined as the initial motion vector for the current block of interpolation frame in operation S809.

Alternatively, in the determining of the initial motion vector in operation S701, when an MVD is greater than the threshold T, a search area is established based on initial motion vectors of blocks adjacent to the current block in operation S807, and an initial motion vector of a block having a smallest block matching error, from among all initial motion vectors of blocks included in the search area, is selected as the initial motion vector of the current block of interpolation frame in operation S809.

Referring back to FIG. 7, the method for frame interpolation according to the example embodiments may perform smoothing with respect to the initial motion vector by selectively applying the Median Filter to an error block having an MVD greater than the threshold T in operation S702 once initial motion vectors are determined for all blocks in the interpolation frame.

Here, the performing of the smoothing in operation S702 may select one or more blocks having an MVD less than the threshold T as candidate blocks, from among adjacent blocks of each error block, apply the Median Filter to an initial motion vector of the candidate blocks, and determine an average of corresponding motion vectors as an initial motion vector of a corresponding error block.

Also, the method for frame interpolation according the example embodiments may determine a 3D result motion vector (x axis, y axis, and rotation) by including a rotation element in the initial motion vector for each block in operation S703 when an optimum initial motion vector is determined for each block in an interpolation frame.

Here, in the determining of the result motion vector in operation S703, to generate an interpolation frame using an initial motion vector V, a block, having moved from the current block of interpolation frame to the previous frame by −V/2, and a block, having moved from the current block of interpolation frame to the current frame by +V/2, are determined as the initial positions. Subsequently, to calculate an accurate rotation element for each block, the block corresponding to the initial location of the previous frame and the block corresponding to the initial location of the current frame are symmetrically rotated to calculate a block matching error between the blocks. Also, a rotation angle corresponding to a smallest block matching error is selected as a rotation element of a corresponding block, and a result motion vector including the rotation element is determined as a precision motion vector for each block in the interpolation frame.

Also, the method for frame interpolation according to the example embodiments may generate an interpolation frame using Overlapped Block Motion Compensation (OBMC) between frames based on the result motion vector in operation S704.

Consequently, the method for frame interpolation according to the example embodiments may perform precise motion estimation through bi-directional motion estimations and rotation estimation, and generate interpolation frames, which are very close to original images, based on a result motion vector made up of three elements of an x axis, y axis, and rotation.

The method for frame interpolation according to the above-described example embodiments may be recorded as computer readable code/instructions in/on a computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

According to the example embodiments, an apparatus for frame interpolation may improve accuracy of motion estimation by estimating precision motion estimation between frames through bidirectional motion estimation and rotation detection.

Also, according to the example embodiments, it is possible to provide high quality images since motion estimation between frames are improved and interpolation images close to original images are generated.

What is claimed is:

1. An apparatus for frame interpolation, the apparatus comprising:
an initial motion vector determination unit to determine an initial motion vector of each of current blocks of an interpolation frame by performing forward motion estimation and backward motion estimation with respect to a current frame and a previous frame, wherein the initial motion vector determination unit comprises:
a forward motion calculation unit to calculate a forward motion vector from the previous frame to the current frame;
a backward motion calculation unit to calculate a backward motion vector from the current frame to the previous frame; and
a motion vector difference calculation unit to calculate a motion vector difference between the forward motion vector and the backward vector for a current block of the interpolation frame;

a filtering unit to filter the initial motion vector based on the motion vector difference between the forward motion vector and the backward motion vector;
a result motion vector determination unit to determine a result motion vector which includes a rotation element by rotating a block of the current frame and the previous frame being determined according to the initial motion vector; and
a frame generation unit to generate the interpolation frame according to the result motion vector,
wherein the result motion vector determination unit comprises:
a rotation element selection unit to select a rotation angle as the rotation element using a block matching error based on the rotating of the block of the current frame and the previous frame.

2. The apparatus of claim 1, wherein the initial motion vector determination unit comprises:
a initial motion vector selection unit to select the initial motion vector of the current block based on the motion vector difference.

3. The apparatus of claim 2, wherein the initial motion vector selection unit selects one of the forward motion vector and the backward motion vector as the initial motion vector.

4. The apparatus of claim 2, wherein the initial motion vector selection unit selects a motion vector having a smaller block matching error from the forward motion vector and the backward motion vector as the initial motion vector.

5. The apparatus of claim 2, wherein the initial motion vector selection unit selects the initial motion vector of the current block by setting a search area based on initial motion vectors of adjacent blocks of the current block.

6. The apparatus of claim 2, wherein the filtering unit applies the Median Filter Algorithm to an error block having a motion vector difference that is greater than a predetermined threshold among all blocks of the interpolation frame.

7. The apparatus of claim 6, wherein the filtering unit selects a candidate block having the motion vector difference being within the threshold, and applies the Median Filter Algorithm using the initial motion vector of the candidate block.

8. The apparatus of claim 1, wherein the result motion vector determination unit further comprises:
an initial location selection unit to select an initial location of each of the current frame and the previous frame using the initial motion vector; and
an error calculation unit to calculate a block matching error between blocks by rotating a block corresponding to an initial location of the current frame and the previous frame.

9. The apparatus of claim 1, wherein the error calculation unit repeats the calculation of the block matching error by symmetrically rotating a block corresponding to the initial location according to a predetermined angle unit.

10. A method for frame interpolation, the method comprising:
determining an initial motion vector of each of current blocks of an interpolation frame by performing forward motion estimation and backward motion estimation with respect to a current frame and a previous frame, wherein the determining of the initial motion vector comprises:
calculating a forward motion vector from the previous frame to the current frame;
calculating a backward motion vector from the current frame to the previous frame; and
calculating a motion vector difference between the forward motion vector and the backward vector for a current block of the interpolation frame;
filtering the initial motion vector based on the motion vector difference between the forward motion vector and the backward motion vector;
determining a result motion vector which includes a rotation element by rotating a block of the current frame and the previous frame being determined according to the initial motion vector; and
generating the interpolation frame according to the result motion vector,
wherein the determining of the result motion vector comprises:
selecting a rotation angle as the rotation element using a block matching error based on the rotating of the block of the current frame and the previous frame.

11. The method of claim 10, wherein the determining of the initial motion vector comprises:
selecting the initial motion vector of the current block based on the motion vector difference.

12. The method of claim 11, wherein the selecting of the initial motion vector selects one of the forward motion vector and the backward motion vector as the initial motion vector.

13. The method of claim 11, wherein the selecting of the initial motion vector selects a motion vector having a smaller block matching error from the forward motion vector and the backward motion vector as the initial motion vector.

14. The method of claim 11, wherein the selecting of the initial motion vector selects the initial motion vector of the current block by setting a search area based on initial motion vectors of adjacent blocks of the current block.

15. The method of claim 11, wherein the filtering the initial motion vector applies the Median Filter Algorithm to an error block having a motion vector difference that is greater than a predetermined threshold among all blocks of the interpolation frame.

16. The method of claim 10, wherein the determining of the result motion vector further comprises:
selecting an initial location of each of the current frame and the previous frame using the initial motion vector; and
calculating a block matching error between blocks by rotating a block corresponding to an initial location of the current frame and the previous frame.

17. The method of claim 10, wherein the calculating of the block matching error between the blocks repeats the calculation of the block matching error by symmetrically rotating a block corresponding to the initial location according to a predetermined angle unit.

18. A non-transitory computer-readable storage medium storing computer readable code comprising a program for implementing the method of claim 10.

* * * * *

UNITED STATES PATENT AND TRADEMARK OFFICE
CERTIFICATE OF CORRECTION

PATENT NO. : 8,494,055 B2  
APPLICATION NO. : 12/382190  
DATED : July 23, 2013  
INVENTOR(S) : Yeol Min Seong et al.

Page 1 of 1

It is certified that error appears in the above-identified patent and that said Letters Patent is hereby corrected as shown below:

In the Claims

In Column 9, Line 19, In claim 2, delete "a" and insert -- an --, therefor.

Signed and Sealed this  
Eighteenth Day of February, 2014

Michelle K. Lee  
*Deputy Director of the United States Patent and Trademark Office*